UNITED STATES PATENT OFFICE.

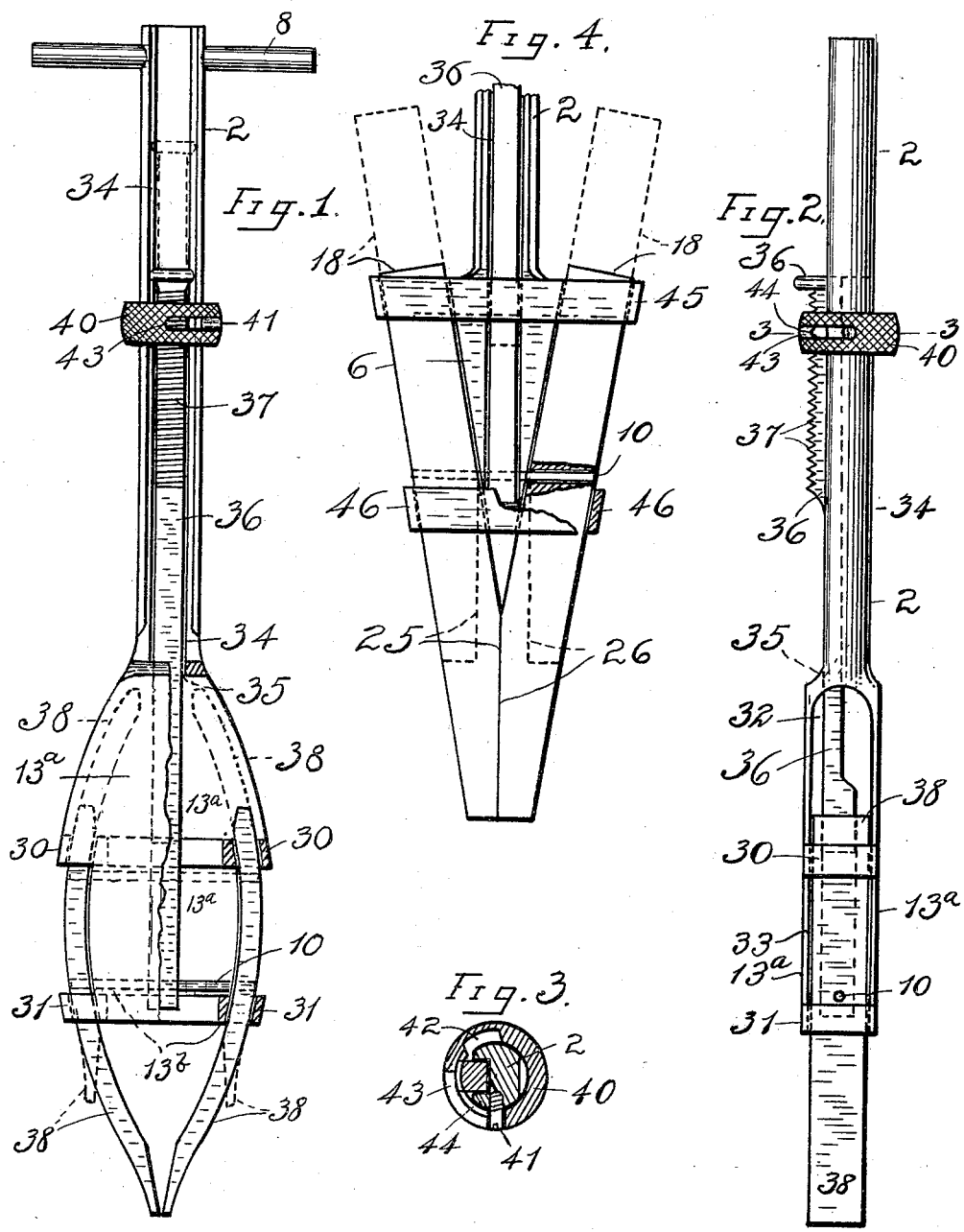

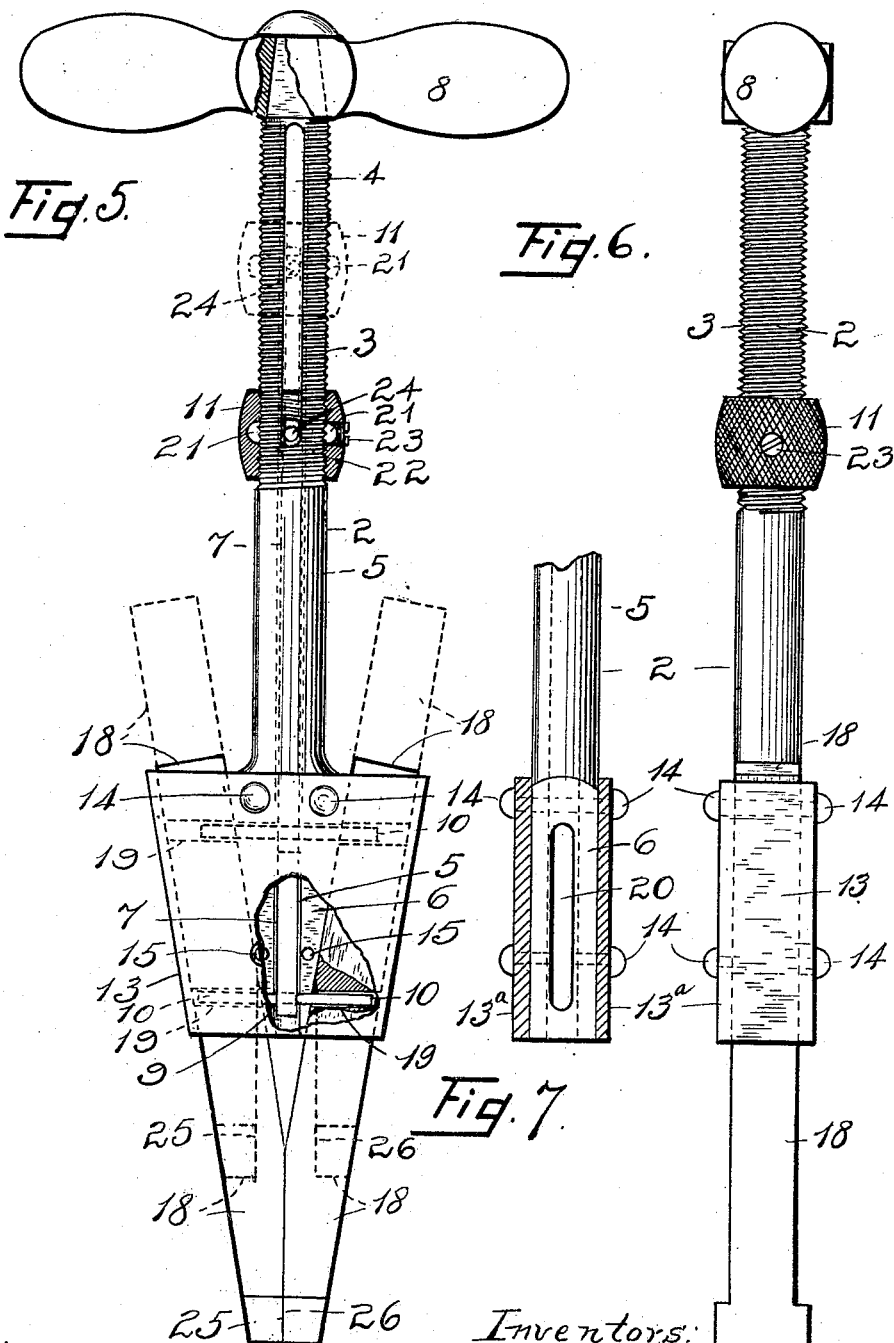

DANIEL M. BRUMFIEL, OF CONNERSVILLE, INDIANA, AND PHILIP G. WRIGHT, OF WILLIAMSTOWN, MASSACHUSETTS.

END WRENCH.

1,074,160.  Specification of Letters Patent.  Patented Sept. 30, 1913.

Application filed August 15, 1912. Serial No. 715,271.

*To all whom it may concern:*

Be it known that we, DANIEL M. BRUMFIEL and PHILIP G. WRIGHT, both citizens of the United States, and residents, respectively, of Connersville, Fayette county, Indiana, and Williamstown, Berkshire county, Massachusetts, have jointly invented a new and useful End Wrench, of which the following is a specification.

Our invention relates to wrenches in which the operative faces of the clamping jaws are in line or substantially in line with the actuating shaft or stem.

The principal object of the invention is to generally improve the construction and increase the capacity, utility and efficiency of the device over those heretofore produced.

To provide for rapid adjustment of the jaws, while yet retaining the usual adjusting nut, is a special object.

That the mechanism constituting the means for accomplishing the above recited objects be simple, strong and durable, is a prime requisite, and to provide such means for carrying out these ends constitutes another object.

Subsidiary objects will be in part obvious and in part pointed out.

The invention accordingly consists in the features of construction, combinations of elements, and arrangement and disposition of the parts shown and described, the scope of which will be pointed out in the appended claims.

The preferred embodiment and two modifications of the invention are shown in the accompanying drawings, in which:

Figure 1 is a front elevation, partly broken away, illustrating the preferred construction; Fig. 2, an edge elevation thereof; Fig. 3, a sectional view, taken in the plane of the line 3—3 in Fig. 2; Fig. 4, a modification, partly broken away; Fig. 5, another modification, quite similar in constructive details to the device shown in Fig. 4, and showing also a modified form of shank and actuating nut; Fig. 6, a side elevation of the structure shown in Fig. 5; and Fig. 7, a detail, partly in elevation and partly in section, illustrating portions of the device shown in Figs. 5 and 6.

Coming now to a detailed description of Figs. 1–3 inclusive, in which the same reference character refers to the same or a like part in the different figures thereof, 2 represents a shank, the lower portion of which is greatly enlarged in both width and thickness and which provides a hollow casing comprising sides $13^a$, bottom piece $13^b$, and apertured projections 30, 31, the inner edges of the latter afforded by the ends of the bottom. These parts are preferably unitary and cast, and the upper and lower pairs of projections (or apertured bosses) afford a transverse slot 33 extending from side to side of and preferably through the casing, while the apertures in each side pair of bosses are preferably oppositely inclined and bear substantially arciform relation to each other. 32 is a transversely arranged slot intermediate the bosses 30 and the upper edge of the casing. The shank 2 is provided with a channel 34 communicating through an aperture 35 with the slot 32. Slidably disposed in said channel is an actuating stem 36 the upper end portion of which is enlarged and provided with threads 37. 10 is a jaw-actuating pin fixed in and transversely of the stem 36 and is adapted for movements in the slot 33. 38 designates each one of a pair of jaws which in these figures are shown as oblong in cross section but which may be of selective cross section, and are, in their body portions, arcuate or bowed. Movements (hereinafter more fully described) of the pin 10, which seats somewhat loosely in an aperture in each jaw, actuate the jaws longitudinally, and as they are drawn upwardly from the full line position shown in Fig. 1 they will traverse the ways in the bosses 30, 31, and will be guided thereby to the positions indicated by the dotted lines. Their lower portions, being inwardly turned, will by the inner walls of the lower bosses be forced apart, as indicated by said dotted lines, said walls in this capacity performing the function of a wedge, the shape of which, it will be evident, is described by them. When the stem is moved downwardly the inner walls of the upper bosses likewise act in the capacity of wedges to separate the upper ends of the jaws and thereby move their faces toward each other. 40 designates a nut provided with an arcuate groove for the reception of a set screw 41 threaded into the shank 2, and is provided also with a longitudinally arranged groove 42 and a thread 44. By imparting to the nut a part rotation to bring the groove 42 into coincidence with the stem 36 their threads become disengaged and the operator may quickly and freely slide said stem in the channel in the shank to instantly actuate the jaws as previously herein described. Reverse movement of the nut will reëngage it with the threads of the stem, whereupon it may be threaded in either direction in the fashion of ordinary devices of like character.

In the modification illustrated by Figs. 5, 6 and 7, 2 indicates the shank, the upper portion of which is externally threaded at 3 and which portion is provided also with a longitudinally arranged slot 4. The intermediate and lower portions of the shank are axially bored at 5 and said lower portion is in the form of a transversely slotted guide or wedge 6 having two parallel and two tapering sides or faces. 7 designates an actuating stem disposed in the bore 5, and 8 represents a handle. Near its lower end the rod 7 is provided with a transversely arranged aperture 9 carrying a pin 10. A rod-actuating nut 11 having an internal annular groove 21 is provided also with internally cut threads 22 which engage the threads 3. One side of said nut is provided with a threaded aperture for the engagement therewith of a set screw 23. Said aperture permits the passage therethrough of a coupling pin 24 which securely engages a radial aperture in the stem 7, the end portions resting loosely in the groove 21. The bolt or screw 23 retains the pin 24 in an evident manner. 13 designates a tapered or wedge-shaped hollow casing to the sides 13ᵃ of which are fixed by rivets 14 (or otherwise) the correspondingly shaped wedge 6, which is provided with suitable apertures 15, a portion of which are shown in Fig. 5. In sliding contact with each edge portion of the casing is a clamping jaw 18, each of which jaws is provided with a recess 19 for the reception of the actuating pin 10, which pin moves freely in the slot 20 in the wedge 6.

Assume the parts to be in the full line position indicated in Fig. 5. The operator, by threading the nut toward the dotted line position shown in said figure will, through the instrumentality of the pin 24 elevate the stem 7, which, moving in the slot 20 will through the medium of the pin 10 cause the jaws to slide upwardly in the ways afforded by the wedge and the sides and edges of the casing, whereby they will open at their operative ends, as indicated by said dotted lines. The opposed faces 25, 26, of the jaws are, in this construction and in the construction shown in Fig. 4, at all times maintained in parallelism. The modification illustrated by said figure is, with the exception that the casing there shown consists of spaced, tapering bands 45, 46 which together form a wedge-shaped structure, and which bands are the equivalents of the corresponding upper and lower portions of the device shown best in Fig. 5, identical therewith and requires herein no further description.

It has been thought neither necessary nor best to encumber this specification and the accompanying drawings with descriptions and illustrations of additional modifications which are within our knowledge. In fact, it is apparent without such that without departing from the scope and general idea of the invention it is susceptible of numerous other changes involving only mechanical skill.

Therefore, without limiting ourselves to particularities of constructive detail we claim as our joint invention the following, namely:

1. In a wrench, a shank terminating in a casing provided on each of its edges with a pair of lugs having apertures arranged substantially in arcs with relation to each other, an arcuate jaw slidably disposed in each pair of said apertures, their concave faces being opposed, a stem slidably disposed with reference to said shank, and a pin actuated by said stem and adapted to impart longitudinal movements to said jaws.

2. A wrench comprising a shank provided with a longitudinally arranged channel and terminating in a casing with which said channel communicates, an actuating stem slidably disposed in said channel and provided with a threaded portion projecting therefrom, jaws working in said casing, guided thereby, and operable by said stem, a nut embracing said shank and stem and engaged with the threaded portion of the latter, said nut provided with an arcuate groove, and a set-screw projected through said groove and adapted for engagement with said shank.

In testimony whereof we hereunto sign our names.

DANIEL M. BRUMFIEL.
PHILIP G. WRIGHT.

Witnesses:
  FERN B. YATES,
  WEBB A. HERLOCKER.

---

Copies of this patent may be obtained for five cents each, by addressing the "Commissioner of Patents, Washington, D. C."